(No Model.)
C. M. McLEOD & J. T. GARRETT.
ANIMAL TRAP.
No. 472,386. Patented Apr. 5, 1892.
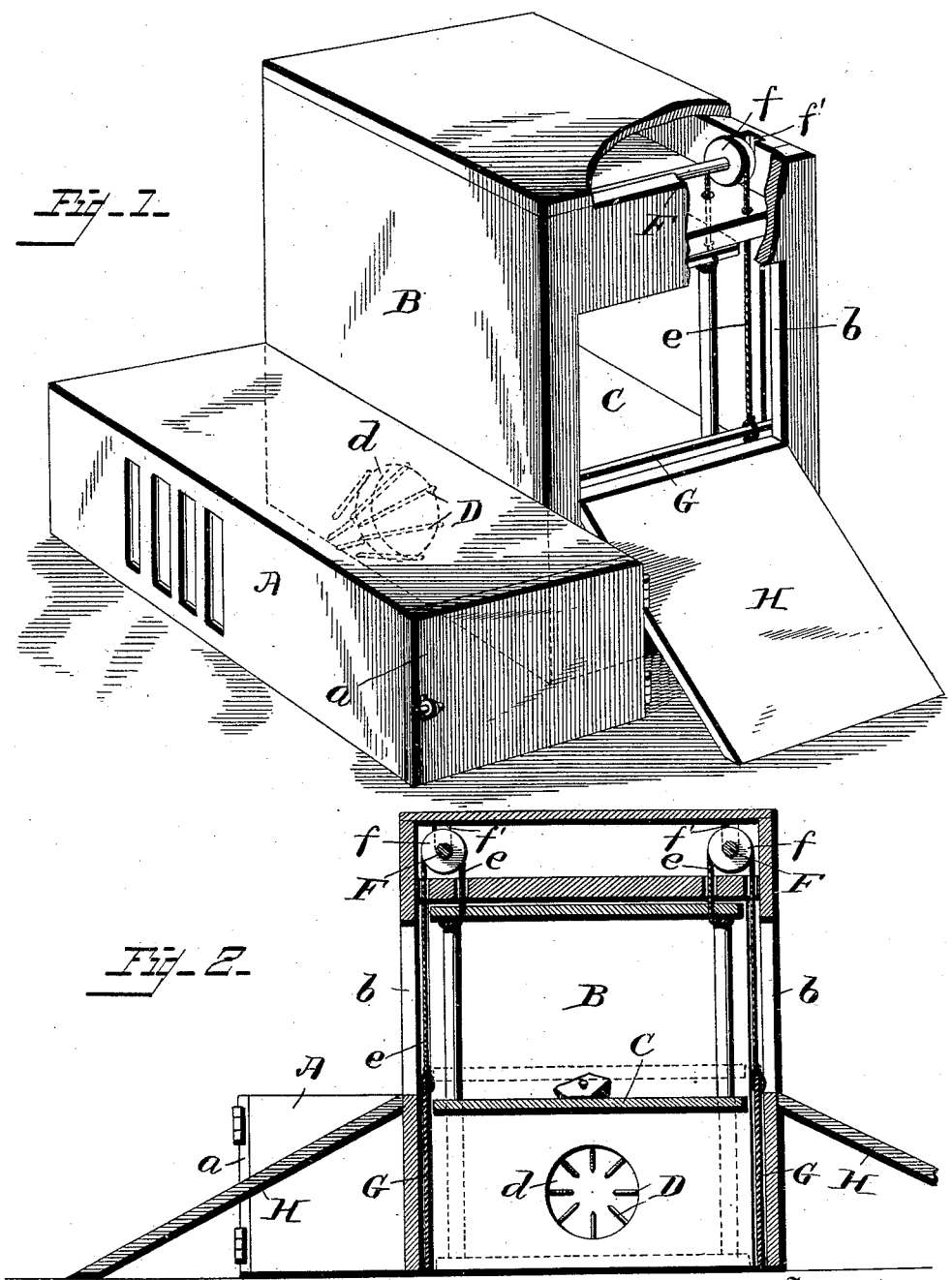
Witnesses
Albert Spenden
Van Buren Hillyard.
Inventors
Charlie M. McLeod.
John T. Garrett.
By their Attorneys
R. S. & H. Lacey ered rat has been en-
UNITED STATES PATENT OFFICE.

CHARLIE MIKE McLEOD AND JOHN T. GARRETT, OF COOPER, TEXAS.

ANIMAL-TRAP.

SPECIFICATION forming part of Letters Patent No. 472,386, dated April 5, 1892.

Application filed December 2, 1891. Serial No. 413,826. (No model.)

*To all whom it may concern:*

Be it known that we, CHARLIE MIKE MC-LEOD and JOHN T. GARRETT, citizens of the United States, residing at Cooper, in the county of Delta and State of Texas, have invented certain new and useful Improvements in Rat and Mouse Traps; and we do hereby declare the following to be a full, clear, and exact description of the invention, such as will enable others skilled in the art to which it appertains to make and use the same.

This invention relates to traps for catching rats, and is an improvement on that class of traps which reset themselves automatically after the rat is entrapped.

The improvement consists of the novel features and the peculiar construction and combination of the parts, which will be hereinafter more fully described and claimed, and which are shown in the annexed drawings, in which—

Figure 1 is a perspective view, parts being broken away, of a trap embodying our invention. Fig. 2 is a vertical section through the cage and well, showing the operation of the cage by dotted lines.

The compartment A for receiving the trapped rats is contiguous to the well B, in which travels the cage C, and is preferably long and narrow, being closed at one end by door $a$, from which the entrapped rats emerge when they are to be disposed of. The wire guard D, of usual construction, through which the rats pass from the cage to the said compartment A, is located opposite the opening $d$, which leads from a side of the well to the said compartment. Openings are formed in the side of the compartment directly opposite the guard D to lure the rats into the said compartment.

The well B is closed on four sides, except the openings $b$ in two diametrically-opposite sides for the entrance of the rats.

The cage E is suspended by four cords or chains $e$, which pass over pulleys $f$ near the upper end of the well. These pulleys $f$ are secured on shafts F, which have bearings at their ends in slots $f'$, formed in the sides of the well. The cords or chains $e$, after passing over pulleys $f$, are weighted sufficiently to hold the cage in proper position to ensnare a rat and to return the said cage to a normal position after the ensnared rat has been entrapped. The weights G are plates which have their ends constructed to slide in grooves in the sides of the well, and which close the openings $a$ and prevent the escape of the rat. The inclined treads H afford easy access for the rats to the cage.

The cage is properly baited, and when a rat comes upon the same the cage descends and the plates or weights G rise and close the openings $a$ and shut the rat in. The light from the openings in the side of the compartment A lures the rat into the said compartment, from which he is unable to escape. The cage as soon as relieved from the weight of the rat rises to its first position and occupies a position to receive and entrap another rat.

Having thus described our invention, what we claim, and desire to secure by Letters Patent, is—

1. The herein shown and described trap, composed of well B, having openings $b$ in diametrically-opposite sides, inclined treads H, leading to openings $b$, cage C, adapted to travel in the well B, plates G, constructed to slide in ways and connected with the said cage to counterbalance the same and slide across the said openings $b$ to close the same, and a compartment contiguous to the well and having communication therewith through guarded opening $d$ and having openings in the side opposite the said opening $d$, substantially as described.

2. In a trap comprising a well having ingress-openings $b$ in diametrically-opposite sides, the combination, with a cage constructed to move vertically in the said well, of plates G, mounted in ways and constructed to slide past and cover the said openings $b$ and having connection with the cage to counterbalance the same, substantially as set forth.

In testimony whereof we affix our signatures in presence of two witnesses.

CHARLIE MIKE McLEOD.
            JOHN T. GARRETT.

Witnesses:
   W. S. MANGUM,
   W. B. LESTER.